United States Patent [19]

Barnes et al.

[11] Patent Number: 5,374,387
[45] Date of Patent: Dec. 20, 1994

[54] PROCESS FOR PROCESSING ELASTOMERIC COMPOSITIONS

[75] Inventors: Roger P. Barnes, Arvada; Jonathan A. Johnston, Northglenn, both of Colo.

[73] Assignee: The Gates Rubber Company, Denver, Colo.

[21] Appl. No.: 10,126

[22] Filed: Jan. 29, 1993

[51] Int. Cl.⁵ .................. B29B 7/72; B29C 47/80
[52] U.S. Cl. .................. 264/211.23; 264/40.6; 264/211.24; 264/349; 425/204
[58] Field of Search .............. 264/211.23, 211.24, 264/349, 68, 40.7, 40.4, 40.6; 425/204, 209, 208, 382.4

[56] References Cited

U.S. PATENT DOCUMENTS

| | | | |
|---|---|---|---|
| 3,817,675 | 6/1974 | Maiocco | 425/207 |
| 4,184,772 | 1/1980 | Meyer | 425/208 |
| 4,197,381 | 4/1980 | Alia | 264/349 |
| 4,454,092 | 6/1984 | Shimizu et al. | 264/349 |
| 4,550,002 | 10/1985 | Uhland et al. | 264/40.7 |
| 4,804,505 | 2/1989 | Venzke | 264/40.7 |
| 4,839,114 | 6/1989 | Delphin et al. | 264/40.4 |
| 4,842,788 | 6/1989 | Johnson | 264/68 |
| 4,897,236 | 1/1990 | Rabiger et al. | 264/211.23 |
| 5,156,781 | 10/1992 | Böhm et al. | 264/40.7 |
| 5,158,725 | 10/1992 | Handa et al. | 264/211.23 |
| 5,262,111 | 11/1993 | Capelle et al. | 264/211.23 |

FOREIGN PATENT DOCUMENTS

| | | |
|---|---|---|
| 0305692 | 3/1989 | European Pat. Off. . |
| 0490056 | 10/1991 | European Pat. Off. . |
| 4130314 | 10/1992 | Germany . |
| 67-03181 | 9/1967 | Netherlands ........ 264/349 |
| 2084037 | 4/1982 | United Kingdom . |

Primary Examiner—Jeffery Thurlow
Attorney, Agent, or Firm—H. W. Oberg; C. H. Castleman; S. G. Austin

[57] ABSTRACT

A process is provided for producing elastomeric compositions by forming a mixture of polymeric material, a reinforcing agent, a processing aid and a vulcanizing agent. The process of the invention is continuous and includes the repeated, sequential steps of admixing the polymeric material along a first mixing zone defined by a space wherein the gross energy applied induces a first operating temperature range. The mixture of the first zone is continuously passed into and through a second mixing zone while adding and admixing the reinforcement agent and processing aid therewith, the second mixing zone being defined by a space wherein the gross energy applied induces a second operating temperature range. The mixture of the second zone is then continuously passed into and through a third mixing zone while adding and admixing the vulcanizing agent therewith, the third mixing zone being defined by a space wherein the gross energy applied induces a third operating temperature range. The mixture of said third zone is the continuously passed into and through a delivery zone to extrude the mixture in the form of the elastomeric composition, with the second and third operating temperature ranges being lower than the first operating temperature range.

19 Claims, 1 Drawing Sheet

PROCESS FOR PROCESSING ELASTOMERIC COMPOSITIONS

BACKGROUND OF THE INVENTION

1. Field of the Invention

The present invention relates generally to the production of elastomeric compositions and, more particularly, to the mixing and production of rubber. Specifically, the present invention relates to an improved process for the continuous mixing and production of elastomeric compositions.

2. Description of the Prior Art

The conversion of elastomeric compositions, and in particular elastomeric polymers such as rubber, into commercially significant materials has been a focal point of the rubber industry throughout its history. The earliest commercial process was largely based on a mixing process utilizing two-roll mills to modify the basic polymer's characteristics by adjusting the viscosity of the polymer as well as by incorporating enhancing ingredients such as reinforcing agents, modifying oils and curatives. Over the years, a wide variety of mixing processes and devices have evolved in the rubber industry. A thorough treatment of such development is set forth in an article entitled, "Development of Internal-Mixer Technology for the Rubber Industry" by James L. White, Rubber Chemistry and Technology, Volume 65, page 528, the contents of which are specifically incorporated herein by reference.

The elastomer mixing process is basically defined as combining the ingredients specified in an elastomeric recipe, on some schedule of addition, and under some regime of mastications for a certain period of time and/or temperature. Rubber elastomer mixing technology is focused principally upon controlling five principal features of the mixing process independent of the recipe specifics. One feature of concern is the uniform distribution of raw materials of the elastomer recipe throughout a single unit mass or volume. The second feature involves dispersive mixing which focuses on the intimate association of the elastomer ingredients in a physical sense, typically at a molecular level, which influence the mechanical characteristics of the final composition. The third feature involves viscosity modification while the fourth feature is concerned with chemical reactions of the ingredients. The final feature involves, of course, economic considerations which control capital utilization and manufacturing costs. These five factors are interrelated, often inversely, and they are sensitive to rate, volume, power, time and temperature limitations.

With the advent of the Banbury mixer, which is described in the above-referenced article, and its commercial adoption, the rubber industry was able to substantially increase uniformity of the process and productivity of manufacturing elastomeric compositions. The Banbury-type intensive mixer, and its many modifications and adaptations as indicated, still remains the primary processing device and process in the rubber industry throughout the world today.

While the Banbury-type intensive mixing process has been adequate, it has certain limitations. Principal among such limitations is the batch or unit production nature of the process. This process requires a minimum of several passes through the Banbury mixer in order to incorporate all ingredients of an elastomeric composition since the Banbury is a batch-type process. This feature is the principal source of variation in characteristics of the final mixed elastomeric stock. Variation in the weights of individual ingredients, the order of addition, timing of addition and discharge, initial temperature of the raw materials and ingredients, and the process environment all contribute to batch-to-batch variation. Even with recent improvements to the Banbury-type process which include automatic weighing systems and computer controlled batch cycles, batch-to-batch variation control remains barely adequate requiring sophisticated protocols for batch blending in subsequent processes.

Another limitation of the Banbury-type process involves the volumetric dynamics of the large working volume of this process. Economic necessity dictates that Banbury-type intensive mixers be scaled to the largest size appropriate to the manufacturing operation. As a result, effective volumetric mixing of a high viscosity mass becomes even more difficult. Concurrent with limitations in volumetric mixing efficiency are thermodynamic control problems due to the marginal, and declining, surface area to mass ratio of increasing volumes within the Banbury mixer.

In order to avoid the aforementioned problems associated with batch mixing processes such as utilized by the Banbury mixer, the rubber industry has attempted to devise continuous mixing systems utilizing a variety of extrusion-type devices. The driving incentives for devising such continuing processes include improved uniformity through steady-state processing, better thermal management resulting from improved surface-to-mass ratios, and developing opportunities for highly automated operations. A variety of processes and devices have been created in attempts to incorporate technical rubber and elastomeric mixing features with extrusion processing systems utilized in other industries. Such extrusion-type devices have been used in the plastics and baking industries for some time. An example of this is illustrated in U.S. Pat. No. 5,158,725. While such devices and processes have enjoyed significant applications in the rapid expansion of thermoplastic polymer processing, none have been widely successful for adaptation by the rubber industry.

A combination of diverse forces have inhibited, up to now, the adoption of continuous extrusion-based processes by the rubber industry. Principal among these forces has been the consistent inability of extrusion-based processes to demonstrate improved uniformity at economically productive rates while maintaining the desired characteristics of the final elastomeric composition. Other factors have included sparse availability of suitable polymer forms, barely adequate mass flow metering systems, and continued inability to control the thermodynamics of the process. Such a lack of thermodynamic control has resulted in unacceptable blending and mixing and in premature curing of elastomers within the extrusion devices. The present invention overcomes the aforementioned disadvantages of batch-type Banbury mixers, as well as overcomes the disadvantages of prior continuous processes such as the control of process thermodynamics and uniform elastomer mixing.

SUMMARY OF THE INVENTION

Accordingly, it is an object of the present invention to provide an improved process for the mixing and production of elastomeric compositions and in particular rubber.

It is another object of the present invention to provide a continuous process utilizing extrusion-type devices for the mixing and production of elastomeric compositions.

It is a further object of the present invention to provide a continuous rubber mixing process which inherently controls the thermodynamics of the process to enhance polymer mixing and to prevent polymer degradation and premature curing.

Another object of the present invention is to provide a continuous process for the mixing and production of elastomers which assures uniform distribution of the components thereof.

To achieve the foregoing and other objects and advantages, and in accordance with the purposes of the present invention, as embodied and broadly described herein, a process for producing elastomeric compositions is provided by forming a mixture of polymeric material, a reinforcing agent, a processing aid and a vulcanizing agent. The process is continuous and includes the repeated sequential steps of admixing the polymeric material along a first mixing zone defined by a space wherein the gross energy applied induces a first operating temperature range. The mixture of the first mixing zone is continuously passed into and through a second mixing zone while adding and admixing the reinforcing agent and processing aid therewith, the second mixing zone being defined by a space wherein the gross energy applied induces a second operating temperature range. The mixture of the second zone is then continuously passed into and through a third mixing zone while adding and admixing the vulcanizing agent, the third mixing zone being defined by a space wherein the gross energy applied induces a third operating temperature range. This mixture from the third zone is then continuously passed into and through a delivery zone to extrude the mixture in the form of an elastomeric composition, the second and third operating temperature ranges being lower than the first operating temperature range.

BRIEF DESCRIPTION OF THE DRAWINGS

The accompanying drawings, which are incorporated in and form a part of the specification, illustrate preferred embodiments of the present invention, and together with a description, serve to explain the principles of the invention. In the drawings.

DESCRIPTION OF THE PREFERRED EMBODIMENTS

The process of the present invention involves the continuous uniform net flow of elastomers including rubbers, rubber/thermoplastic polymer mixtures, and the like, with reinforcing agents including fillers, processing aids such as oils, waxes and the like, and curatives appropriate to the application through a system of at least three and preferably four discrete zones of mixing and controlled material addition. In each of these mixing zones, the shear rate, shear stress, energy flux and temperature are interrelated and individually controllable in order to produce an elastomeric material of improved uniformity at economically productive rates. By carefully controlling these variables in each zone, the energy balance and equilibrium can be maintained to permit the process to run at equilibrium or at a steady state without external temperature control mechanisms which are not adequate due to slow heat transfer of elastomers.

The composition components may be those typical of any type of elastomeric composition recipe. The rubber elastomers may include, but are not limited to, natural rubber, cis-polyisoprene, styrenebutadiene, acrylonitrile-butadiene, polychloroprene rubber, poly-(ethylene-propylene diene monomer), cis-polybutadiene, polyacrylate, poly-isobutylene, poly-chloroisobutylene, and silicone rubbers. Typical thermoplastic polymers may include, but are not limited to, polyvinyl chloride, polyethylene, polypropylene, polyamide, polyester, polyether, polyethylene-acrylate, flouropolymers, and ionomer polymers.

The reinforcing agents may include one or more of, but are not limited to, carbon black, fumed and precipitated silica, siliane treated clays, and short fibers of reinforcing materials. The reinforcement agents may also include fillers such as calcium carbonate, talc, kaolin clays, silicas and petroleum coke. Processing aids may include oils and waxes. Other added components may also include anti-oxidants/ozonants, adhesion promoters, fire retardants, foaming agents, compatibilizers and colorants. The oils, both plastizing and extending, may be either petroleum or pthalate-ester based as appropriate. Finally, curatives useful with the present invention may be of any desired selection but are preferably, although not exclusively, amine catalyzed sulphur systems, other sulfur containing organic compounds, metal oxides and peroxides.

While certain specific examples will be discussed with respect to the process of the present invention, it should be understood that the present invention is applicable to a wide variety of elastomeric compositions, recipes and components thereof and may include reinforced elastomers as well as elastomeric alloys.

Figure 1:
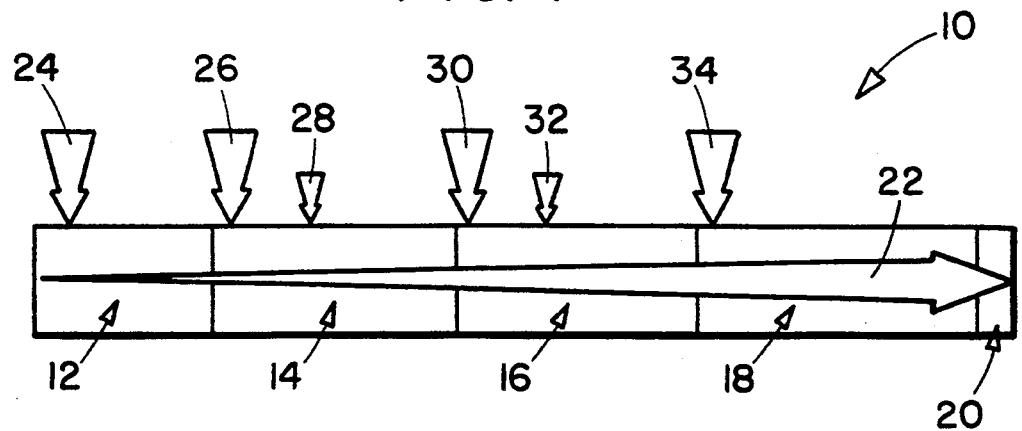
FIG. 1 is a flow diagram illustrating the sequential staging of the process of the present invention.

Referring now to FIG. 1, a flow diagram 10 is illustrated therein. In this flow diagram 10, the process of the invention is divided into a plurality of mixing zones including a first mixing zone 12, a second mixing zone 14, a third mixing zone 16, which is optional, a fourth mixing zone 18 and a fifth zone 20 which is, in preferred form, a delivery or extruding zone as described below. The composition mixture is processed and moved through zones 12–20 in the direction indicated by the arrow 22. The polymer mixture 24 is added at the beginning of the first mixture zone 12, and the reinforcing agents 26 and the processing aids 28 are preferably separately and sequentially added as indicated at the beginning and mid-portion of the second mixing zone 14. An optional mixing zone 16 may be included wherein the same or additional reinforcing agents 30 and processing aids 32 are separately added to the composition flow 22. Finally, the curatives or vulcanizing agents 34 are added at the beginning of the mixing zone 18 to complete the addition and admixing of the various components of the elastometric composition. The mixture flow 22 is then directed through the delivery zone 20 wherein the mixture flow is extruded into the form of the final elastomer composition through some sort of die slot or the like.

Figure 2:
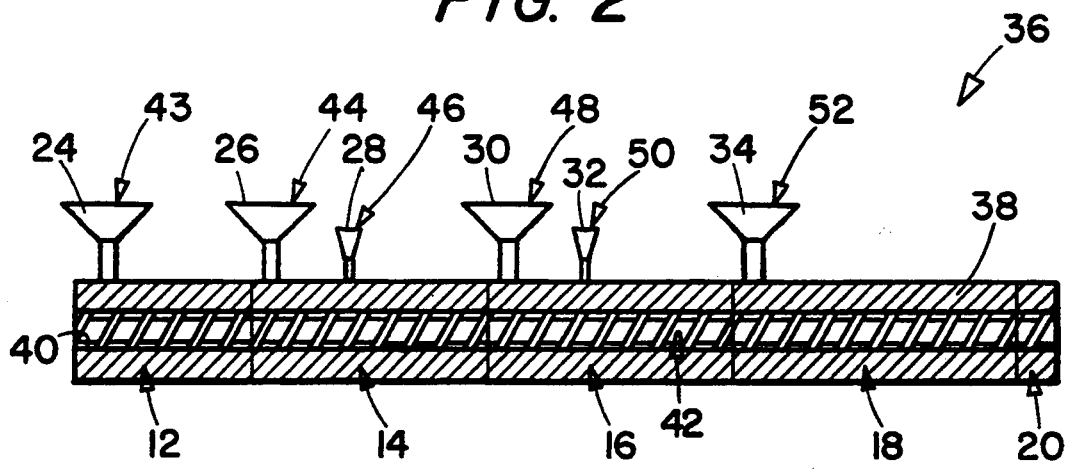
FIG. 2 is a schematic cross section of a typical twin-screw extruder adapted to incorporate the process of the present invention.

Referring now to FIG. 2, the process of the present invention, in preferred form, is accomplished by continuously metering, individually and preferably gravimetrically by weight loss feeders, particulated materials and/or liquids as described above in the proportion prescribed by the particular application formula or recipe, to an extrusion device 36 capable of applying about 0.08–0.23 KW-Hrs/Kg shear energy on a continuous basis. For the purposes of the process of the present invention, any type of device 36, including stacked Banburys, which will incorporate the process of the invention may be utilized. The generic extruder device 36 as disclosed in FIG. 2, includes a barrel 38 having a pair of central cylinders 40 and a pair of extrusion screws 42 positioned within the cylinders 40 (with only one cylinder 40 and screw 42 being illustrated). As each screw 42 rotates within the barrel 38, elastomeric materials pass through the cylinder 40 from the first zone indicated at 12 to the fifth zone indicated at 20. A feed device 43 is provided to feed polymeric material 24 into the first zone 12, while feed devices 44 and 46 are provided to meter, respectively, reinforcing agents 26 and processing aids 28 into the second mixing zone 14. Metering or feed elements 48, 50 are, likewise, utilized to deliver the second set of reinforcing materials 30 and processing aids 32 into the optional third mixing zone 16. Finally, a metering member 52 is provided to deliver the vulcanization or curing materials 34 into the fourth mixing zone 18.

In preferred form utilizing a twin-screw extruder, the component particulate materials must have particle size distributions consistent with the clearances between the rotating screw element 42 and the stationery walls of the cavity 40 within the barrel 38. The particle size must be sufficiently small to be distributed quickly and completely into the mass of material being mixed. However, finely ground materials are unnecessary. Polymers 24, in particular, do not require grinding to fine powders and can be chopped to a distributional median of about 80% of the clearance between the screw 42 and the wall of the cylinder 40 at the point of addition 43.

With respect to a suitable distribution of the physical dimensions of particle sizes, a suitable distribution based on weight of particle size has been found to range from 1–90% of the maximum radial distance between the rotating member 42 and the stationary surface of the cavity 40. The mean value, based on weight, preferably ranges from 65–75% of the free radial distance.

Typical examples of extrusion devices include intermeshing co-rotating and counter-rotating twin-screw extruders and certain other multiple screw masticating extruders. Nominal shear rates should preferably be in the range of 40–120 sec$^{-1}$ with localized shear rates reaching substantially higher levels such as 1500 sec$^{-1}$. A preferred configuration illustrated at 36 is a single intermeshing co-rotating twin screw extruder having a length to diameter ratio (L:D) in the range of 30–55 and more preferably 50–55. However, other device configurations are contemplated as useful with the process of the present invention, including multiple devices arranged in a cascaded fashion with the material passing continuously from one device to the next. In all instances of device configuration, however, provision is made for at least four separate material addition ports 43, 44, 46 and 52, as indicated above, to provide for incremental addition of the above-referenced materials in the specific order provided: polymers 24, reinforcing agents and/or fillers 26, processing aids and/or oils 28, and vulcanization agents 34. Provision may be required, depending upon the characteristics of the formulation being mixed, for up to four additional material ports. In the illustrated preferred embodiment, two additional material ports 48 and 50 are provided for introducing a second grouping or set of reinforcing agents 30 and processing aids 32.

It is strongly preferred, though not required, that the internal volume of the mixing device 36 be incrementally increased at each material addition port in proportion to the volume of material introduced at each port so as to maintain a substantially constant mixing volume fill factor within the cavity 40. Fill factors may vary in the range of 10–90% of the effective volume of the device to accommodate specific requirements of temperature, viscosity, dispersion and production throughput. More preferably, the fill factor volume is in the range 10–30%. Moveover, the rotating members of the mixing extruder may preferably be composed of a variable combination of conveying elements and semi-conveying elements which make up the screw 42 and which impart distribute mixing and high shear stress.

Referring now to both FIGS. 1 and 2, the overall process may be described in the following manner. The polymers 24 are introduced into the process in the first zone 12 by means of individually metered, continuous mass flow streams through the feeder 43 in proportions appropriate to the desired recipe and at the desired production rate. Certain other chemical modifiers such as zinc oxide, anti-oxidants, and the like may also be introduced into this first mixing zone 12 along with the principal polymers. Anti-oxidants will protect the polymers when subjected to higher temperature. However, in the preferred embodiment no reinforcing agents nor processing aids are to be introduced in this first zone 12.

The combined materials introduced at the beginning of the first zone 12 are then subjected to mixing and shearing stresses at programed shear rates for a controlled amount of time resulting in thorough blending of the mixture as well as an increase in temperature and reduction of viscosity. These details are illustrated in Table I. It was discovered that by increasing the temperature due to high shear rates and other variables as indicated herein in the first mixing zone 12, the viscosity could be substantially reduced thereby making the remainder of the mixing process and in particular the admixing of the reinforcing agents such as carbon black much easier.

TABLE I

|  | FIG. 1 UNITS | 12 ZONE 1 | 14 ZONE 2 | 16 ZONE 3 (COND) | 18 ZONE 4 | 20 DIE ADAPTER | OVERALL |
|---|---|---|---|---|---|---|---|
| Standard Mass Flow Rate$^a$ | kg/s × m$^3$ | 200–900 | 425–1800 | 515–2100 | 525–2150 | NA | 525–2150 |
| Standard Volumetric Flow Rate$^b$ | m$^3$/s × m$^3$ | 0.23–0.95 | 0.35–1.60 | 0.35–1.65 | 0.38–1.70 | NA | 0.38–1.70 |
| Exit Temperature | °C. | 130–220 | 110–160 | 85–130 | 115–150 | 120–160 | NA |
| Gross Energy Applied$^c$ | J/kg | $5.4 \times 10^5$– $1.1 \times 10^4$ | $4.3 \times 10^4$– $7.2 \times 10^4$ | $3.6 \times 10^4$– $1.1 \times 10^5$ | $3.6 \times 10^4$– $1.1 \times 10^5$ | $3.0 \times 10^3$– $4.0 \times 10^3$ | $2.9 \times 10^5$– $6.5 \times 10^5$ |
| Net Energy Absorbed$^d$ | J/kg | $-1.8 \times 10^5$– $-2.9 \times 10^5$ | $-3.6 \times 10^4$– $-5.4 \times 10^4$ | $-3.6 \times 10^3$– $-2.9 \times 10^4$ | $-1.8 \times 10^4$– $-6.2 \times 10^4$ | $-1.8 \times 10^3$– $-3.6 \times 10^3$ | $-1.1 \times 10^5$– $-1.8 \times 10^5$ |
| Energy Loss$^e$ | J/kg | $-4.7 \times 10^5$– | $-3.6 \times 10^4$– | $-3.6 \times 10^3$– | $-3.6 \times 10^4$– | 0.0– | $-2.2 \times 10^5$– |

TABLE I-continued

|  | FIG. 1 UNITS | 12 ZONE 1 | 14 ZONE 2 | 16 ZONE 3 (COND) | 18 ZONE 4 | 20 DIE ADAPTER | OVERALL |
| --- | --- | --- | --- | --- | --- | --- | --- |
| Minimum Residence Time | sec | $-6.8 \times 10^5$ 25–50 | $-7.2 \times 10^4$ 6–15 | $-3.6 \times 10^4$ 6–15 | $-8.0 \times 10^4$ 7–20 | $-3.2 \times 10^3$ 10–35 | $-3.6 \times 10^5$ 54–135 |
| Median Residence Time | sec | 50–70 | 10–20 | 10–20 | 10–40 | 15–40 | 95–190 |
| Volume Ratio$^f$ | % | 12–25 | 15–30 | 10–25 | 10–25 | NA | NA |
| Apparent Shear Stress | Pa | $5.0 \times 10^8$– $8.0 \times 10^8$ | $5.0 \times 10^7$– $7.0 \times 10^7$ | $2.0 \times 10^7$– $1.0 \times 10^8$ | $3.0 \times 10^7$– $1.0 \times 10^8$ | $3.5 - 10^4$– $4.5 \times 10^4$ | NA |
| Apparent Viscosity | Pa × s | $4.0 \times 10^4$– $8.5 \times 10^4$ | $3.0 \times 10^4$– $6.5 \times 10^4$ | $2.5 \times 10^4$– $6.0 \times 10^4$ | $1.0 \times 10^4$– $2.0 \times 10^4$ | $1.7 \times 10^5$– $3.5 \times 10^5$ | NA |
| Applied Energy Surface Flux$^g$ | J/m² | $2.1 \times 10^4$– $5.0 \times 10^4$ | $6.6 \times 10^4$– $1.4 \times 10^5$ | $6.6 \times 10^4$– $1.0 \times 10^5$ | $1.0 \times 10^5$– $1.1 \times 10^5$ | NA | $1.2 \times 10^4$– $2.2 \times 10^4$ |

$^{(a)}$Mass flow rate an kg/hr divided by the radius of the cavity cubed.
$^{(b)}$Volumetric flow rate in cm³/second, divided by the radius of the cavity cubed.
$^{(c)}$Total energy applied to the mixing chamber, not including motor and gear box losses.
$^{(d)}$Total energy absorbed the the material passing through the mixing chamber.
$^{(e)}$Total energy loss from the process to through the walls of the mixing cavity. Losses are controlled by the thermal conduction rate of the material and residence time.
$^{(f)}$Percentage of the mixing cavity volume occupied by the material.
$^{(g)}$Total energy applied per unit area of the mixing cavity surface.

However, this high shear and temperature can only occur over a short period of time, therefor necessitating rapid movement of the mixture through this first zone 12.

The masticated polymer mixture is then continuously passed from the first zone 12 into the second zone 14 in which individually metered, temperature controlled, mass flow streams of reinforcing agents 26 and processing aids 28 are sequentially introduced into the masticated polymer mixture. The compounded volume of the materials introduced into the second zone 14 should preferably not exceed 90% of the volume of the polymer mixture flowing from the first zone 12. The resulting polymer/filler-oil mixture or mass-flow composition is then subjected to mixing and shearing stresses at programed shear rates for a controlled period of time in the second zone 14, resulting in complete distributive and dispersive incorporation of the reinforcement materials and processing aids. Temperatures and apparent viscosities are typically reduced in the second zone 14 as compared to the first zone 12. The reinforcement materials are preferably carbon black and may also include mineral fillers, short fibers and small chemicals. Oils and waxes are preferably introduced as the processing aids.

The admixture which has been passed through the second zone 14 is then continuously passed into and through the third optional zone 16 or directly into the fourth zone 18. The conditional nature of the optional third zone 16 is dependent upon the actual recipe requirement of the elastomeric composition for additional reinforcement agents, fillers and/or oils exceeding the volume limit previously indicated for the second zone 14. The third zone 16 is typically the zone in which small constituent chemicals such as adhesion promoters, anti-ozonants, color additives, fire retardants and the like are preferably introduced to the admixture. The materials introduced to the third zone 16 are again individually metered, temperature controlled., mass flow streams. The resultant mixture is then subjected to mixing and shearing stresses at programmed shear rates for controlled periods of time to completely distribute and disburse the materials added. Material temperatures in the third zone 16 continue to decline as compared to the second zone 14. Apparent viscosities may increase or decrease depending on the nature of the materials introduced to the third zone 16.

The mixture from either the second zone 14 or the third zone 16, if utilized, is then passed continuously into the fourth zone 18 in which the vulcanizing agents 34 are added. The vulcanizing agents may include small constituent chemicals, curative agents, and the like, and are added to the mixture at sufficient pressure to develop the force needed to direct the mixture through the exit orifice of the fourth zone 18 and into and through the delivery zone 20. The completely formulated and mixed material is then passed into the delivery zone 20 wherein the material forming die is placed. An appropriate exit die adapter is positioned where the density of the mixture is increased, and the mixture is then forced through a forming surface appropriate to the desired application for the elastomeric composition. The elastomeric composition is then subjected to rapid cooling, typically by spraying or immersion in a water bath, dried, and then deposited in or on an appropriate storage medium.

The process of the present invention provides for superior dispersion and uniformity of component materials as compared to conventional batch mixing processes due to the sequenced adding of the component portions while maintaining control of the magnitude and rate of energy application, temperature of the material being mixed, total torque on the mixing equipment, and maximizing material throughput. The preferred volume flow rates, exit temperatures at each mixing zone, energy applied, and the like, are all outlined in Table I. As a result of the invention, the extruder 36 operates at equilibrium without application of any external heating or cooling to the device 36. This is due, in part, to controlling the temperatures of the components as they are added during the process, thus acting as heat sinks.

Energy management rate and magnitude of the application of energy to the process of the present invention is essential in order to obtain the mixing objectives desired while limiting undesirable temperature and torque buildup. Excess temperature buildup, in the first instance, will initiate premature vulcanization reactions leading to a condition known as scorch and scrap material. Secondarily, excessive temperature buildup will oxidize and depolymerize the polymers resulting in loss of physical properties. Excessive torque produces negative economic results by shortening mixing device life and reducing productivity as well as creating excessive temperature.

The process of the present invention functions, in part, due to the acknowledgment of the characteristically poor thermal conductivity rates of most rubber compounds typically exhibiting thermal conductivity rates of only one-tenth of the material used in the construction of the mixing device. This fact coupled with the rapid transport rate of the mixture through the process of the present invention, that is short exposure times, precludes the need for significant use of heat exchange media in order to reduce excessive energy buildup in the mixture. In normal operation, the process of the present invention proceeds with a mixing device at equilibrium with the environment. The rheological properties of any particular elastomeric composition recipe are significantly important in the management of energy in the process of invention. Each polymer type and each recipe based on that polymer has a unique response to the application of shearing energy, yielding unique apparent shear stress and temperature rise. The net energy applied to the mixture in each mixing zone 12-20 results from the energy input from high intensity shearing within the barrel 38 plus transport energy less the energy lost in the environment through the mixer barrel 38. This is expressed by the following relationship:

$$E_3 = V_3 \int_{T_1}^{T_2} \frac{m\dot{\gamma}_s^{\frac{n}{T}}}{T} dT + V_1 \frac{m\dot{\gamma}_t^{\frac{n}{T_2}}}{T_2} + V_3 \frac{\lambda(T_{cav} - T_2)2A_3}{G_3} \quad (1)$$

Glossary

| | |
|---|---|
| $\tau$ | Apparent shear stress, Pa |
| $\dot{\gamma}$ | Apparent shear rate, $s^{-1}$ |
| $\dot{\gamma}_s$ | High shear region apparent shear rate, $s^{-1}$ |
| $\dot{\gamma}_t$ | Volume transport apparent shear rate, $s^{-1}$ |
| m | Apparent intrinsic viscosity, Pa · s |
| n | Characteristic temperature, °K. |
| T | Actual temperature, °K. |
| $T_1$ | Initial temperature, °K. |
| $T_2$ | Final temperature, °K. |
| $T_{cav}$ | Cavity surface temperature, °K. |
| $T_{a \ldots n}$ | Initial temperature of discrete materials, °K. |
| $M_{a \ldots n}$ | Mass flow rate of discrete materials, Kg · $s^{-1}$ |
| $M_t$ | Total mass flow rate, Kg · $s^{-1}$ |
| $C_{pa \ldots n}$ | Discrete heat capacity, J/Kg/°K. |
| $E_s$ | Net shear energy applied to material, J |
| $E_t$ | Thermodynamic energy applied, J |
| $V_s$ | Volume in high shear region, $m^3$ |
| $V_t$ | Total volume of material transported, $m^3$ |
| $A_s$ | High shear region surface area, $m^2$ |
| $G_s$ | High shear region cavity-rotor clearance, m |
| $\lambda$ | Thermal conductivity coefficient, J/$m^2$/°K. |

The gross energy applied is dependent on the shear rates, the volume of the mixture in each shearing region, the ratio of mixture volume to the cavity 40 surface, initial temperatures and residence time. The shear rates, in turn, are dependent in part upon relative surface velocities and clearances between the screw 42 and cavity wall 40.

As a result of experimental trials as discussed below, it has been determined that high rates of energy input through high shear to melt the polymers and reduce viscosity need only be applied to the polymer mass at the first zone 12, with the remaining constituents present in the elastomeric composition recipe being either low temperature melting, low viscosity liquids, or solids at all processing temperatures through the device 36. The input power required for the total process per unit mass of throughput can be minimized by the early and rapid reduction of the polymer viscosity within the first mixing section 12. This is an important contribution to the economic productivity of the process of the invention with finite power capability. It has also been discovered that effective mechanical blends of polymers within the first mixing zone 12 is best achieved when their respective viscosities are similar in value. This is most effectively accomplished at very high shear rates, that is greater than 600 $sec^{-1}$ for brief periods of time. It should be noted, however, that care must be practiced with shear rate energy flux so that shear sensitive polymers are not depolymerized as previously explained. The energy required to incorporate solid reinforcement materials, including carbon black, is relatively small when compared to the energy required to render the polymers 24 sufficiently fluid to facilitate incorporation of the reinforcement materials 26. Finally, maintaining low and constant admixture to cavity volume ratios typically in the 15-30% range, as previously explained, facilitates relatively uniform energy flux, volumetric blending and residence time in each mixing zone 12-20.

The energy applied to the admixture in each mixing zone of processing may also be evaluated thermodynamically by applying a 'law of mixtures' approach to the discrete mass flows, heat capacities and temperature changes of the separate material flows comprising the admixture in each zone, as in the following relationship:

$$E_t = \Sigma \frac{M_a}{M_t} C_{pa}T_2 - T_a, \frac{M_b}{M_t} C_{pb}T_2 - T_b, \quad (2)$$

$$\frac{M_c}{M_t} C_{pc}T_2 - T_c, \ldots, \frac{M_n}{M_t} C_{pn}T_2 - T_n$$

In order for the process of the invention to be balanced and operate in equilibrium, equation (1)=(2). It is evident from equation (2) that temperature management in any zone may be readily facilitated by sequential control of mass flow rates, selection of materials, initial material temperatures and timing of addition of the various constituents introduced to each zone, independent of the thermal status of the mixing device. The high energy flux into the polymer in the first zone 12 and resulting increase in temperature, is promptly and effectively transferred to the mass of carbon black and oil introduced in the second zone 14. The result is a rapid progression to equilibrium temperature which is both safe and suitable for further processing.

As previously indicated, the process of the present invention provides a uniquely different situation from traditional batch mixing processes in that there is, at any productivity rate, a static working volume of material in the batch process which maintains static mixing dynamics and energy flux. The process of the present invention, however, requires sequential additions which Change the working volume of the material, with ratios from the initial polymer addition to the finally finished elastomeric composition of 1:2 to 1:3.5. Thus, as previously indicated, the volume of the cavity 40 within each of the mixing zones 12-20 is preferably increased from zone 12 to 20, preferably in accordance with the particular ratio range just stated.

EXAMPLE I

The typical formulation of the process of the present invention is described as follows:

TABLE II

| MATERIAL | WEIGHT PERCENT |
|---|---|
| Polymer A | 20.3 |
| Polymer B | 10.1 |
| Carbon Black | 33.4 |
| Mineral Filler | 10.5 |
| Processing Oil | 21.2 |
| Zinc Oxide | 1.5 |
| Stearic Acid | 0.5 |
| Anti-oxidant | 0.6 |
| Accelerator A | 1.1 |
| Accelerator B | 0.6 |
| Sulfur | 0.2 |

Utilizing this typical formulation, polymer materials 24 added at port 43 would include polymer A, polymer B, zinc oxide, and anti-oxidant. The reinforcement materials 26 added at the port 44 would include approximately two-thirds of the carbon black and stearic acid. The processing aids added at the port 46 would preferably include one-half of the processing oil. In this instance, of course, the third optional zone 16 is utilized and the materials added at the port 46 would include the remaining one-third of the carbon black and the mineral fillers, while the remaining one-half of the processing oils will be added at the port 50. Finally, the vulcanizing agents 34 added at the port 52 would include the accelerator A, accelerator B and sulfur.

In this particular instance, utilizing a preferred intermeshing co-rotating twin screw extruder, mass flow restricter mechanisms would preferably be utilized at the exit of the first mixing zone 12 to assure complete viscosity reduction of the elastomer fraction prior to the first introduction of the reinforcement materials 26 at the beginning of the second mixing zone 14 as well as to regulate and control mass flow of polymer melt relative to the reinforcement material, thereby maintaining correct proportional portions. In each of the following mixing sections 14–18, the extruder screw 42 is preferably utilized to regulate mass flow and internal metering within the device 36. Control of temperature, and incremental mix viscosity, within the mixing process of the present invention is vital to control the degree of material dispersion and the final mixed properties of the elastomeric composition.

Viscosity may be controlled by a variety of dynamic methods simultaneously and include adjusting the volumetric fill factor, the rotational velocity of the screw 42, the rotational element-to-fixed wall clearances, the order of material addition, the material addition temperature, the mass flow restriction, and the heat exchange media (if any) circulated within the device 36. By monitoring temperature and pressure at the exit of each incremental mixing section as indicated in Table I, incremental and/or final viscosities may be measured in real time and controlled. With the assistance of computerized analysis and control, the mixing process of the invention may be dynamically controlled within a very narrow and consistent control span. As indicated, residence time within the device 36 is important, and is preferably 1.2–1.8 minutes from the introduction at the beginning of the first mixing zone 12 to the extrusion of the elastomer at the end of the delivery zone 20.

EXAMPLE II

A number of experimental trials were conducted utilizing five different elastomeric composition recipes and several different process parameters. The five different recipes are detailed in Table III, and are used merely as examples for the process. The specific selected compounds such as the carbon black, pigments, anti-oxidants, accelerators, and the like, are unimportant except that they remain the same in each recipe throughout all of the different process tests.

TABLE III

| MATERIAL | RECIPE 1 100 RHC | RECIPE 2 100 RHC | RECIPE 3 100 RHC | RECIPE 4 100 RHC | RECIPE 5 100 RHC |
|---|---|---|---|---|---|
| EPDM A | 86.21 | | | | |
| EPDM B | | 15.00 | 19.35 | | |
| EPDM C | 13.79 | | | | |
| EPDM E | | 85.00 | 80.65 | | |
| NBR A | | | | | 100.00 |
| NBR B | | | | 24.60 | |
| SBR A | | | | 103.70 | |
| PVC A | | | | 24.60 | |
| Carbon Black A | 153.25 | 130.00 | | | |
| Carbon Black B | | | 42 | 87.10 | 113.40 |
| Pigment A | 19.16 | | | | |
| Pigment B | | | | 33.90 | |
| Pigment C | | | 64.52 | | |
| ZnO | 4.94 | 5.00 | 5.00 | 4.10 | 4.70 |
| Oil A | 97.03 | 77.00 | 58.06 | | |
| Oil B | | | | | 14.20 |
| Oil C | | | | 1.30 | |
| Oil D | | | | 35.20 | |
| Stearic Acid | 0 | 0.50 | 0.50 | 0.70 | 1.00 |
| Anti-oxidant A | | | 1.50 | | |
| Anti-oxidant B | | | | 0.4 | |
| Anti-oxidant C | | | | | 1.00 |
| Anti-oxidant D | | | | 2.00 | |
| Anti-oxidant E | | | | 2.00 | |
| Anti-oxidant F | | | | 2.00 | |
| Wax A | | | | 2.00 | |
| Chem B | | | | 4.50 | |
| Accelerator A | 0.743 | | | 0.70 | |
| Accelerator B | 1.073 | 2.50 | 2.50 | | |
| Accelerator C | | 0.80 | 0.80 | | |
| Accelerator D | | 0.80 | 0.80 | | |
| Accelerator E | 1.463 | 2.00 | 2.00 | | |
| Accelerator F | 2.965 | | | | |
| Accelerator G | | | | | 1.50 |

TABLE III-continued

| MATERIAL | RECIPE 1 100 RHC | RECIPE 2 100 RHC | RECIPE 3 100 RHC | RECIPE 4 100 RHC | RECIPE 5 100 RHC |
|---|---|---|---|---|---|
| Accelerator H | | | | 1.70 | |
| Curative A | | | | | 0.30 |
| Curative B | 0.513 | | | 2.70 | 2.20 |

Upon running the recipes through each test, the test results included the following:

1. Traditional stress/strain mechanical properties. This measured the overall quality of mixing process and distributive uniformity.
2. Thermal gravimetric analysis. This measured mass percent, and variance of major recipe components, that is polymer, oil, carbon black and mineral fillers.
3. The Monsanto oscillating disc rheometer. This measured the chemical kinetics of vulcanization chemistry and dynamic shear modulus.
4. Capillary rheology. This evaluated the degree of polymer blending and dispersive mixing by measuring shear stress and viscosity as a function of shear rate and temperature.
5. Dynamic torque modulus. This measured the degree of dispersive mixing.
6. Transmission electron microscopy. This provided visual evaluation of filler dispersion.

All of the testing in this and the following examples were made with the Table III recipes and were evaluated relative to a statistically appropriate batch process mixed control of the identical recipe.

The process of the present invention was carried out in these tests utilizing a co-rotating twin screw device of Berstorff and Werner-Pfleiderer types. For this Example II, the process utilized a two mixing zone approach, wherein the polymers, reinforcement agents and processing aids were all admixed together in the first zone, and the vulcanizing agents were then admixed in the second zone. While good to excellent dispersion of the reinforcing fillers was accomplished, process temperatures were unacceptably high with unacceptable production rates. Using recipes 1 and 3, process exit temperatures of 160°–200° C. were measured, and premature vulcanization and polymer degradation was observed at production rates of approximately 310 kg/s/m³. In this instance, the mixing extruder length to diameter ratio ranged from 12:1 to 20:1 with residence times of 45–130 seconds.

EXAMPLE III

Analysis of the data suggested from the thermodynamices of the Example II, indicated that the two zone mixing approach was incorrect. In this instance, a three zone mixing process was utilized wherein the first mixing zone included the addition of the polymeric materials and approximately 30% of the reinforcement material such as carbon black and zinc oxide. The second zone added the remainder of the reinforcement material and the processing aids, and the third mixing zone added the vulcanizing agents. Recipes 1, 2 and 3 were mixed at production rates of 610 kg/s/m³. The oil, which was the processing aid, was temperature conditioned at 20° C. The revised material sequence of this Example III and the controlled oil addition temperature provided sufficient cooling to reduce the exit temperature to 140°–150° C. The added material addition zone extended the length to diameter ratio to 42.5:1. Residence time of the materials within the extruder was approximately 125 seconds, with a total energy applied ranging from $5.4 \times 10^5$–$6.5 \times 10^5$ J/kg. Good to excellent carbon black dispersion, comparable to a batch process control, was measured from this Example III using dynamic modulus at 1% and 25% strain as the measure.

While carbon black dispersion appeared to be equal to or improve relative to the batch process, the three zone process implemented in this Example III continued to produce unacceptable process exit temperatures relative to production rate and high input energy values because of the carbon black addition to the first zone. Moreover, mineral filler dispersion appeared to be somewhat poorer in this Example III for the continuous mixed material as compared to batch processing material.

Coolant hose products were manufactured from the materials mixed in this Example III and placed on long-term field trials. After 18 months of field trial, there were no reported product failures. The continuously mixed materials of recipes 1, 2 and 3, extruded with lower power requirements, lower temperatures, and improved surface uniformity when compared to batch process materials of the same recipes. Analysis of the materials in this Example III indicated that while improvements in processing temperatures and material quality had been made in a continuous process verses batch process, productivity remained low. There appeared to be some additional productivity potential in the configuration before reaching process limits of temperature and/or power requirements.

EXAMPLE IV

Yet another set of trials was planned with the same three zone configuration of Example III and material addition schedule but with no modifications to the process thermodynamics, which therefore focused more shear stress to the first mixing zone. This Example IV was set up to test maximum productivity of the three-zone process of the present invention. Production rates were elevated from 610 kg/s/m³ to 1,210 kg/s/m³ before upper input power and temperature limits were realized. In this Example IV, productivity was doubled and measures of carbon black and mineral filler dispersion were substantially improved.

Unfortunately, similar temperature and pressure data was not collected in Examples II and III, so clear comparisons could not be made. It was expected, however, that the total exposure to polymer degrading temperatures was less in this Example IV configuration than in the configurations previously employed.

One significant liability associated with sequential addition of materials in a continuous process is the consistent mass flow of individual raw material streams. Any continuous processing system is primarily a first in, first out system with only modest back blending along the axis of material flow (22). Non-uniformity of mass flows of the separate ingredient streams can result in unacceptable constituent variability in the final product. Analysis for percent of polymer, carbon black, oil and mineral fillers in the results of Example III indicated unacceptable levels of variation. After obtaining production rates approaching desirable commercial levels in this Example IV, analysis of variation was made, and examination of the data in this particular Example IV indicated that the continuously mixed recipe 3 was uniformly more consistent than comparable batch process mixed material.

EXAMPLE V

Another set of trials, this time utilizing recipes 1 and 3, was initiated in which the thermodynamics of the process were further differentiated into the four mixing zone configuration outlined in FIGS. 1 and 2 and described above. In the four zone configuration in this particular Example V the polymers, zinc oxide and anti-oxidants were added in the first zone 12. In the second zone 14, the carbon blacks and oils to approximately 90% of the volume of the mixture from the first zone 12 were added. In the third zone 16, the remainder of the carbon black and mineral fillers and oils were added. Finally, the vulcanization agents were added to the fourth mixing zone 18. This was as described previously. The thermodynamic objective of this Example V was to completely isolate the high shear, high energy input portion of the process to the polymeric materials in the first mixing zone 12. The rationale was to masticate the polymers at a high rate of energy input within only the first mixing zone 12, elevate their temperatures above normal processing temperatures so as to reduce their viscosities to very low values prior to introduction of the reinforcing fillers at the beginning the second mixing zone 14. This process would, necessarily, require very short, that is 15-20 seconds, residence times to avoid thermal degradation of the polymers.

The effect of this Example V was to apply the energy necessary to achieve good mixing rheology, that is low viscosity, only to the material components which are susceptible to shearing energy. The stored thermal energy, temperature, was present in a minor percentage of the total recipe mass. The addition of the carbon black and oil in the second and third zones 14 and 16 were then easily disbursed into the low viscosity polymer volume and served to absorb the energy present in the polymer, thus reducing the temperature of the mixture to an acceptable processing level. The addition temperature of the reinforcing fillers was room temperature, that is 23° C., and the oil was temperature controlled to about 20° C. In order to maintain a more constant working volume-to-gross volume ratio, the gross volumes of the second, third and fourth zones 14, 16 and 18, respectively, were increased with respect to the first zone 12.

The vulcanizing agents were added to the fourth zone 18 to isolate the chemical reactivity occurring during curing from the high temperatures and residence times present earlier in the process of the invention, thereby preventing premature vulcanization.

An important feature of this Example V was the ability to manipulate the first zone 12 residence time, exit temperature and exit viscosity by means of adjustable clearance capability at the exit of the first zone 12. This feature facilitated a transfer of thermodynamic work from the second and third zones to the first zone. When the exit clearance was reduced, thereby transferring more of the work to the first zone 12, productivity was increased by approximately 20%, and an unexpected reduction in applied power, in the range of $3.6 \times 10^5$ J/kg to $4.5 \times 10^5$ J/kg was measured. Temperatures and pressures remained within acceptable process levels.

Analysis of the results of this Example V indicated consistently improved uniformity of material properties. The traditional stress/strain mechanical properties for recipe 1 mixed in this Example V indicated similar good compliance with the established specification and uniformity measures which are substantially better than the batch process standards. As a result, it can be seen from Example V that the preferred four mixing zone configuration as illustrated in FIGS. 1 and 2 provided substantially improved results as compared to batch processing of the same recipes.

As can be seen from the above, the present invention provides an economic means of producing relatively improved homogeneity of final material properties of elastomeric compositions. Experimental results indicate an improvement of at least 50% in standard deviation of final material property when compared to traditional batch mixing. Micro uniformity of material distribution was even better on the basis of very small samples. Fine dispersion of reinforcing fillers was relatively improved by 5-20% when compared to batch mixed materials of the same formulation. Viscosity of the elastomeric composition produced with the present invention was much lower and consistently more uniform, at extrusion and calendaring temperatures resulting in dimensionally more consistent rubber components. In formulations using discontinuous short fiber reinforcement, fiber incorporation and dispersion was substantially easier and better when compared to batch mixed processes. The present invention, therefore, affords the opportunity to produce new and unique polymer blends and/or alloys with thermoplastic polymers which are thermodynamically impossible to control when using traditional batch process mixers. The independent/staged mixing process of the present invention not only provides a more uniform elastomeric composition product, but also provides a much shorter period of time to achieve the same inasmuch as it only requires one pass through a device incorporating the process of the present invention as compared to a plurality of passes using the batch mixing process. Thus, a more uniform product can be produced in less time and utilizing less energy, thereby providing substantial economic savings as compared to existing technology.

The foregoing description and the illustrative embodiments of the present invention have been described in detail in varying modifications and alternate embodiments. It should be understood, however, that the foregoing description of the invention is exemplary only, and that the scope of the invention is be limited only to the claims as interpreted in view of the prior art. Moreover, the invention illustratively disclosed herein, suitably may be practiced in the absence of any element which is not specifically disclosed herein.

The embodiments of the invention in which an exclusive property or privilege is claimed are defined as follows:

1. In a process for producing elastomeric compositions by mixing an elastomeric material, a reinforcing agent, a processing aid and a vulcanizing agent, the improvement comprising the successive steps of:
simultaneously shearing, heating to a temperature of a first operating temperature range, and sufficiently reducing the viscosity of the elastomeric material to facilitate admixing at least a portion of the reinforcing agent;

adding at least a portion of the reinforcing agent having a lower temperature than that temperature of the first operating temperature range of the so heated and reduced viscosity elastomeric material; and admixing the lower temperature reinforcing agent to the so heated and reduced viscosity elastomeric material while simultaneously 1) cooling the elastomeric material by means of the lower temperature reinforcing agent, and 2) forming a mixture of elastomeric material and reinforcing agent having a temperature that is less than the temperature of the so heated elastomeric material.

2. The process of claim 1 and further including after the step of admixing, the steps, of separately adding and admixing at least a portion of the processing aid having a temperature less than that temperature of the so heated elastomeric material, and aiding cooling of the higher temperature elastomeric material and forming a mixture of elastomeric material, reinforcing agent and processing aid having a temperature of a second operating temperature range that is less than the so heated temperature of the elastomeric material.

3. The process of claim 1 and further including the successive steps of separately adding and admixing the vulcanizing agent therewith and forming a mixture of elastomeric material, reinforcing agent, processing aid and vulcanizing agent having a temperature of a third operating temperature range.

4. The process of claim 2 and further including the successive steps of:

separately adding and admixing a second portion of reinforcing agent having a temperature less than that temperature of the mixture of elastomeric material, reinforcing agent and processing aid, and separately adding and admixing a second portion of the processing aid having a temperature less than that temperature of the heated elastomeric material.

5. The process of claim 3 and further including the successive steps of expelling the mixture as an elastomeric composite.

6. The improvement as claimed in claim 3 wherein said first operating temperature range is approximately 130°–220° C., said second operating temperature range is approximately 110°–160° C., and said third operating temperature range is approximately 115°–150° C.

7. The improvement as claimed in claim 3 wherein a gross energy applied to process steps in achieving the temperature of the first operating temperature range comprises approximately $5.4 \times 10^5$ to $1.1 \times 10^6$ J/kg, a gross energy applied to process steps associated in achieving the temperature of the second operating temperature range comprises approximately 4.3 to $7.2 \times 10^4$ J/kg, and a gross energy applied to process steps associated in achieving the temperature of the third operating temperature range comprises approximately $3.6 \times 10^4$ to $1.1 \times 10^5$ J/kg.

8. The improvement as claimed in claim 1 comprising limiting shearing and preventing depolymerization of said polymeric material.

9. The improvement as claimed in claim 3 wherein a volume percentage of said mixture is maintained substantially the same throughout the processing steps.

10. The improvement as claimed in claim 3 wherein prior to the step of shearing, the step of admixing up to thirty percent by weight of the reinforcing agent with the elastomer and maintaining said first operating temperature range at approximately 130°–220° C., said second operating temperature range at approximately 110°–160° C., and said third operating temperature range at approximately 115°–150° C.

11. The improvement as claimed in claim 3 wherein during or prior to the shearing, heating and reducing steps, the step of adding a polymer which is different than the elastomeric material.

12. A process for producing elastomeric compositions utilizing an elongate twin-screw extruder, said process comprising:

admixing components of a composition including elastomeric material, a reinforcing agent, a processing aid and a vulcanizing agent in sequential staged-additions along a length of said extruder which has at least five successively interconnected mixing zones and comprising the steps of:

adding and mixing said elastomeric material along the first mixing zone of the extruder and simultaneously shearing, heating and sufficiently reducing the viscosity of the elastomeric material along the first mixing zone of the extruder to facilitate admixing at least a portion of the reinforcing agent;

separately and sequentially adding at least a portion of a cooler reinforcing agent and processing aid to the so heated elastomeric along the second mixing zone of the extruder while simultaneously cooling the elastomeric material with said reinforcing agent and processing aid;

separately and sequentially adding a second portion of a cooler reinforcing agent and processing aid to a local component mixture along the third mixing zone of the extruder while cooling the component mixture with a second portion of reinforcing agent and processing aid;

adding and admixing the vulcanizing agent to a local-component mixture along the fourth mixing zone of the extruder; and moving a local component mixture along and through the fifth zone of the extruder and extruding said mixture in the form of said elastomeric composition.

13. The process as claimed in claim 12, wherein said material is moved along said extruder having a length to diameter ratio of approximately 50–55 to 1.

14. The process as claimed in claim 12, wherein said mixture is admixed in said first mixing zone under high shear conditions.

15. The process as claimed in claim 12, wherein polymeric material is added in a coarsely chopped condition.

16. The process as claimed in claim 12, wherein said mixing zones are maintained in a substantially starved condition.

17. The process as claimed in claim 16, wherein said component mixture is maintained at substantially 15–30% of the volume of each said mixing zone in order to facilitate relative uniform energy flux, volume blending and residence time in each said mixing zone.

18. The process as claimed in claim 12, wherein the productivity rate of said process is up to 2,500 kg/sec.m$^3$.

19. The process as claimed in claim 12, wherein the energy balance of said extruder is at steady state during operation of said process.

* * * * *